(12) United States Patent
Doppler et al.

(10) Patent No.: US 8,023,524 B2
(45) Date of Patent: Sep. 20, 2011

(54) COOPERATIVE RELAY SYSTEM ENABLING SIMULTANEOUS BROADCAST-UNICAST OPERATION WITH EFFICIENT AUTOMATIC REPEAT REQUEST FUNCTIONALITY

(75) Inventors: Klaus Doppler, Espoo (FI); Ari Hottinen, Espoo (FI)

(73) Assignee: Nokia Corporation, Espoo (FI)

( * ) Notice: Subject to any disclaimer, the term of this patent is extended or adjusted under 35 U.S.C. 154(b) by 837 days.

(21) Appl. No.: 11/973,778

(22) Filed: Oct. 9, 2007

(65) Prior Publication Data
US 2009/0092073 A1 Apr. 9, 2009

(51) Int. Cl.
*H04L 12/28* (2006.01)

(52) U.S. Cl. .................................................. 370/431

(58) Field of Classification Search .................. 370/229, 370/235, 236, 310, 315, 351, 400, 431, 432; 455/7, 10, 15–17
See application file for complete search history.

(56) References Cited

U.S. PATENT DOCUMENTS

| | | | |
|---|---|---|---|
| 7,593,342 B2 * | 9/2009 | Molisch et al. | 370/238 |
| 7,684,337 B2 * | 3/2010 | Mehta et al. | 370/238 |
| 7,933,549 B2 * | 4/2011 | Larsson | 455/7 |
| 2006/0270363 A1 * | 11/2006 | Sandhu et al. | 455/101 |
| 2007/0165581 A1 | 7/2007 | Mehta et al. | 370/338 |
| 2009/0005104 A1 * | 1/2009 | Wang et al. | 455/522 |
| 2009/0086666 A1 * | 4/2009 | Guvenc et al. | 370/328 |
| 2009/0207771 A1 * | 8/2009 | Lindskog et al. | 370/312 |

OTHER PUBLICATIONS

Gerard Foschini et al., "Simplified Processing for High Spectral Efficiency Wireless Communication Employing Multi-Element Arrays", IEEE Journal on Selected Areas in Communications, vol. 17, No. 11, Nov. 1999.

Ari Hottinen et al., Chapter 8, "Robust and Practical Open-Loop Designs", Multi-Antenna Transceiver Techniques for 3G and Beyond, 2003.

P.W. Wolnianski et al., "V-Blast: An Architecture for Realizing Very High Data Rates Over the Rich-Scattering Wireless Channel", Bell Laboratories, Lucent Technologies, Crawford Hill Laboratory, 1998.

Ralf Pabst et al., "Relay-Based Deployment Concepts for Wireless and Mobile Broadband Radio", IEEE Communications Magazine, Sep. 2004.

Ernesto Zimmermann et al., "A Novel Protocol for Cooperative Diversity in Wireless Networks", The Fifth European Wireless Conference—Mobile and Wireless Systems beyond 3G, Feb. 2004.

J. Nicholas Laneman et al., "Cooperative Diversity in Wireless Networks: Efficient Protocols and Outage Behavior", IEEE Transactions on Information Theory, Apr. 2003.

J. Nicholas Laneman et al., "Limiting Analysis of Outage Probabilities for Diversity Schemes in Fading Channels", IEEE Global Communications Conference (GLOBECOM), San Francisco, Dec. 2003.

(Continued)

*Primary Examiner* — Dmitry H Levitan (74) *Attorney, Agent, or Firm* — Harrington & Smith (57) ABSTRACT

A wireless node, such as a relay node, has different operating modes for unicast and broadcast/multicast subchannels. For unicast services the phase offsets of those relay nodes engaged in a cooperative transmission are optimized for the subchannels used for unicast services. Alternatively, when no feedback is available and an open loop MIMO or MIMO-type scheme is in use, retransmissions are performed in such a way that a destination (e.g., user terminal) receives effectively a distributed space-time block code. For the broadcast/multicast services time varying random phase offsets may be employed for the subchannels used for broadcast services. For reliable high data rate broadcast transmissions a cooperative retransmission scheme that effectively forms distributed space-time block codes may be used.

23 Claims, 8 Drawing Sheets

OTHER PUBLICATIONS

Ernesto Zimmermann et al., "The Impact of Cooperation on Diversity-Exploiting Protocols", 59th IEEE VTC 2004-Spring, May 17-19, 2004, vol. 1A.

I. Stanojev et al., "Performance Analysis of Collaborative Hybrid-ARQ Protocols over Fading Channels", Proc. Sarnoff Symposium, NJ, USA, Mar. 2006.

Siavash Alamouti, "A Simple Transmit Diversity Technique for Wireless Communications", Selected Areas in Communications, IEEE Journal, vol. 16, Issue 8, Oct. 1998, pp. 1451-1458.

Information Society Technologies, "Assessment of Relay Based Deployment Concepts and Detailed Description of Multi-Hop Capable RAN Protocols as Input for the Concept Group Work", IST-4-027756 Winner II, D3.5.2. v1.0, Jun. 30, 2007.

Ari Hottinen et al., "Scheduling in a Randomized Relay Network", Proc. CISS 2006, Princeton, NJ, USA.

IEEE Std 802.16e-2005, "Part 16: Air Interface for Fixed and Mobile Broadband Wireless Access Systems Amendment 2: Physical and Medium Access Control Layers for Combined Fixed and Mobile Operation in Licensed Bands and Corrigendum 1", (Feb. 28, 2006), (864 pages).

IEEE P802.16/D1, "Part 16: Air Interface for Fixed and Mobile Broadband Wireless Access Systems Multihop Relay Specification", (Aug. 8, 2007), (240 pages).

* cited by examiner

OPERATING A PLURALITY OF RELAY NODES TO COOPERATIVELY TRANSMIT UNICAST DATA FROM A SOURCE TO A DESTINATION RECEIVER

9B

WHILE COOPERATIVELY TRANSMITTING THE UNICAST DATA, AT LEAST ONE OF THE PLURALITY OF RELAY NODES RESPONDING TO FEEDBACK SIGNALING FROM THE DESTINATION RECEIVER FOR CAUSING TRANSMISSIONS FROM EACH OF THE PLURALITY OF RELAY NODES TO ADD COHERENTLY AT THE DESTINATION RECEIVER

OPERATING A PLURALITY OF RELAY NODES TO COOPERATIVELY TRANSMIT UNICAST DATA FROM A SOURCE TO A DESTINATION RECEIVER

10B

WHILE COOPERATIVELY TRANSMITTING THE UNICAST DATA, RESPONDING TO A REQUEST FOR RETRANSMISSION FROM THE DESTINATION RECEIVER BY AT LEAST ONE OF THE PLURALITY OF RELAY NODES CHANGING TRANSMISSION SYMBOLS SUCH THAT A COOPERATIVE RETRANSMISSION RESULTS IN THE DESTINATION RECEIVER EFFECTIVELY RECEIVING A DISTRIBUTED SPACE-TIME BLOCK CODE

COOPERATIVE RELAY SYSTEM ENABLING SIMULTANEOUS BROADCAST-UNICAST OPERATION WITH EFFICIENT AUTOMATIC REPEAT REQUEST FUNCTIONALITY

TECHNICAL FIELD

The exemplary and non-limiting embodiments of this invention relate generally to wireless communication systems, methods, devices and computer program products and, more specifically, relate to techniques for operating a cooperative relay system and the relay nodes thereof.

BACKGROUND

Various abbreviations that appear in the specification and/or in the drawing figures are defined as follows:
3GPP third generation partnership project
ARQ automatic repeat request
BPSK binary phase shift keying
DAS distributed antenna system
FEC forward error correction
H-ARQ hybrid-ARQ
LTE long term evolution
OFDMA orthogonal frequency division multiple access
OTD orthogonal transmit diversity
MBMS multimedia broadcast and multicast services
MIMO multiple input, multiple output
NACK negative acknowledge
QAM quadrature amplitude modulation
QPSK quadrature phase shift keying
SINR signal to interference noise ratio
STTD space time transmit diversity
DSTTD double space time transmit diversity
V-BLAST vertical Bell Labs layered space-time architecture
WIMAX worldwide interoperability for microwave access (IEEE 802.16)

Figure 1:
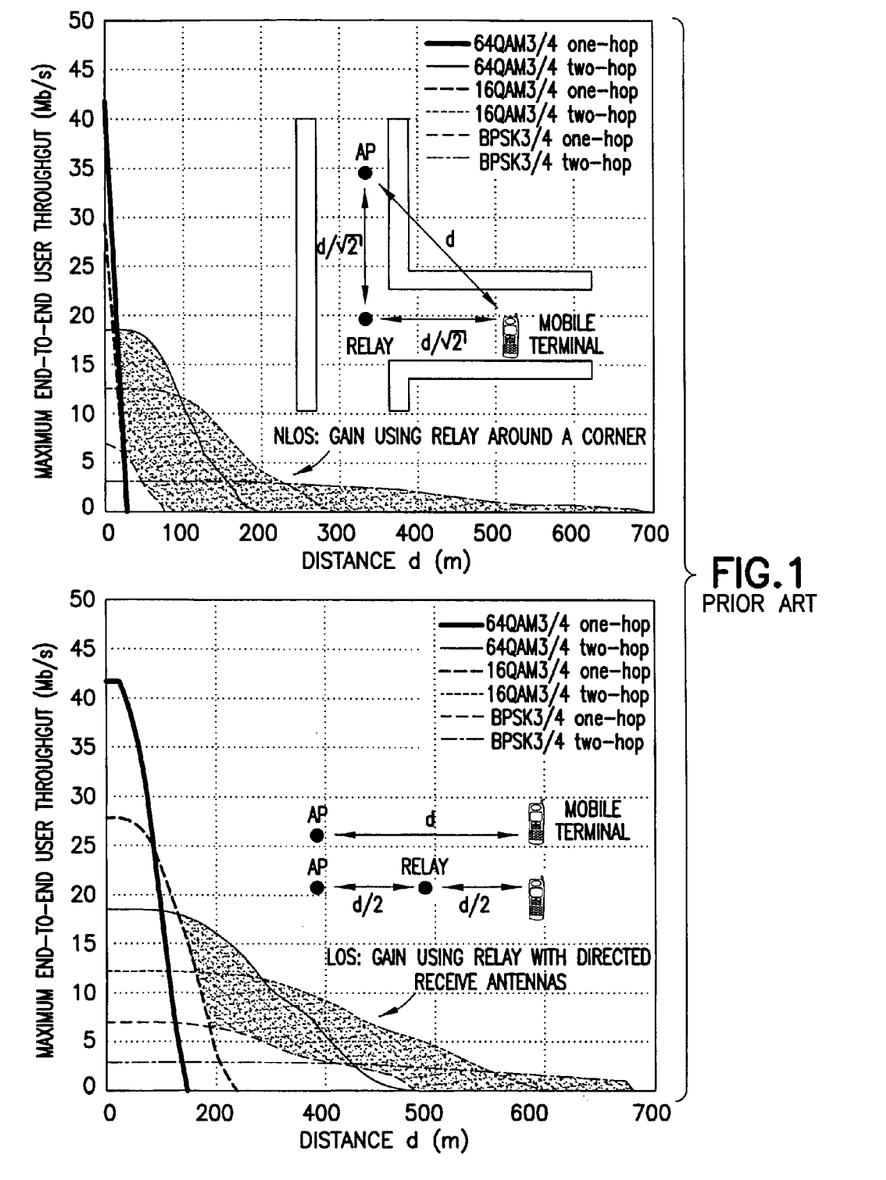
FIG. 1 shows the use of a relay at street crossing, and indicates the gain in data rate achieved by the use of the relay.

In present and future mobile communication systems it is desirable to provide high data rate coverage for mobile terminals serviced by the communication systems. Typically, only those mobile terminals that are physically close to a base station can operate with a very high data rate, and to provide a high data rate coverage over a large geographical area a large number of base stations would be required. As the cost of implementing such a system can be prohibitive, research is being conducted on alternative techniques to provide wide area, high data rate service. One of the most promising, and currently heavily researched techniques, is to use relays or relay nodes to distribute the data rate more evenly in a cell served by a particular base station. FIG. 1 illustrates this principle for a layer two relay located at a street crossing (see R. Pabst, B. H. Walke, D. C. Schultz, P. Herhold, H. Yanikomeroglu, S. Mukherjee, H. Viswanathan, M. Lott, W. Zirwas, M. Dohler, H. Aghvami, D. D. Falconer, G. P. Fettweis, "Relay-Based Deployment Concepts for Wireless and Mobile Broadband Radio", IEEE Communications Magazine, September 2004). The darker areas indicate the gain in data rate achieved by the relay. Note that only very close to the base station is the data rate approximately half of the original data rate, however the high data rate is more evenly distributed in the coverage area.

One problem that is presented is how best to integrate relays into a wireless communication system. In general, the performance gain realized by the use of relays when integrated in a wireless communication system should by maximized, while the interference caused by relays to the communication system should be minimized. One approach is to use cooperative relaying, i.e., instead of one relay, two or more relays are engaged in a single transmission and thus similar benefits to those realized in multi-antenna transmissions can be achieved. Moreover, due to the higher spatial separation, as compared to co-located antennas in traditional MIMO systems, the MIMO channel matrix is typically better conditioned.

Figure 2:
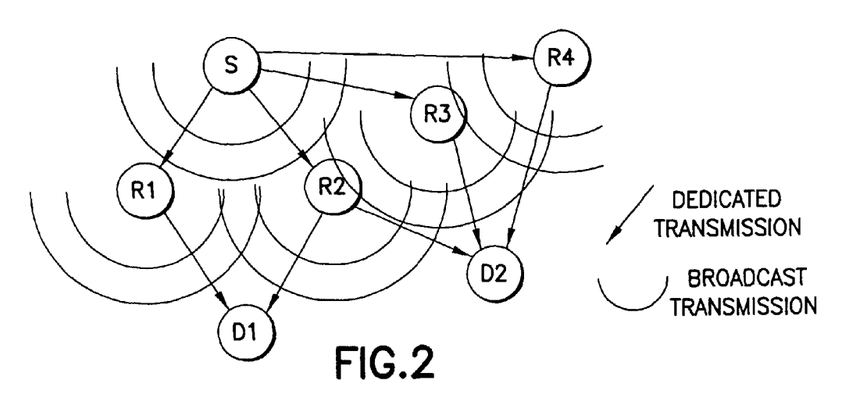
FIG. 2 shows simultaneous cooperative broadcast and unicast transmissions at relays and base stations.

In addition, future radio communication systems are envisioned to be very flexible and to support many different services at the same time. OFDMA systems offer a high flexibility and allow, for example, broadcast, multicast and unicast transmissions at the same time. OFDMA is proposed for use in many future radio systems, such as 3GPP LTE and WiMAX, and has been researched in the WINNER project. Cooperative relaying operations for broadcast/multicast have been previously proposed, but there is no efficient relay operation that would allow broadcast/multicast and optimized unicast transmission at the same time. FIG. 2 illustrates such a network.

Figure 3:
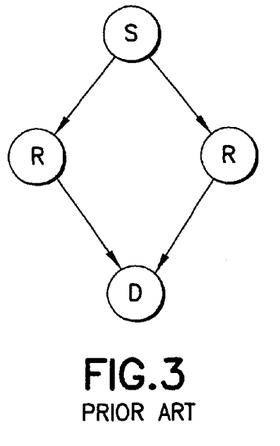
FIG. 3 is an example of a cooperative relaying network.

Of interest to the exemplary embodiments of this invention that are described below is a network where the source (S) cannot necessarily communicate directly with the destination (D), and communicates with the destination through relays (R). FIG. 3 illustrates such a network. For example, in the downlink of a cellular network the source would be the base station and the destination the mobile terminal.

To illustrate the concept, assume that the source controls the operation of the relay. Thus it tells the relays at what time and at which OFDMA sub-channel(s) they are to transmit a received packet to the destination. This reflects also the current implementation of cooperative relaying in the WINNER project (see WINNER II Deliverable D3.5.2, "Assessment of relay based deployment concepts and detailed description of multi-hop capable RAN protocols as input for the concept group work", June 2007).

Instead of an optimized unicast transmission based on closed loop MIMO schemes with feedback, the relays can, for example, use open loop MIMO schemes such as V-BLAST for their unicast transmission. Reference with regard to V-BLAST can be made to "V-BLAST: An Architecture for Realizing Very High Data Rates Over the Rich-Scattering Wireless Channel", P. W. Wolniansky, G. J. Foschini, G. D. Golden, R. A. Valenzuela Bell Laboratories, Lucent Technologies, Crawford Hill Laboratory (1998). Reference can also be made to "Simplified Processing for High Spectral Efficiency Wireless Communication Employing Multi-Element Arrays", G. J. Foschini, G. D. Golden, R. A. Valenzuela, P. W. Wolniansky, IEEE Journal on Selected Areas in Communications, Vol. 17, No. 11, November 1999, pgs. 1841-1852.

Figure 4:
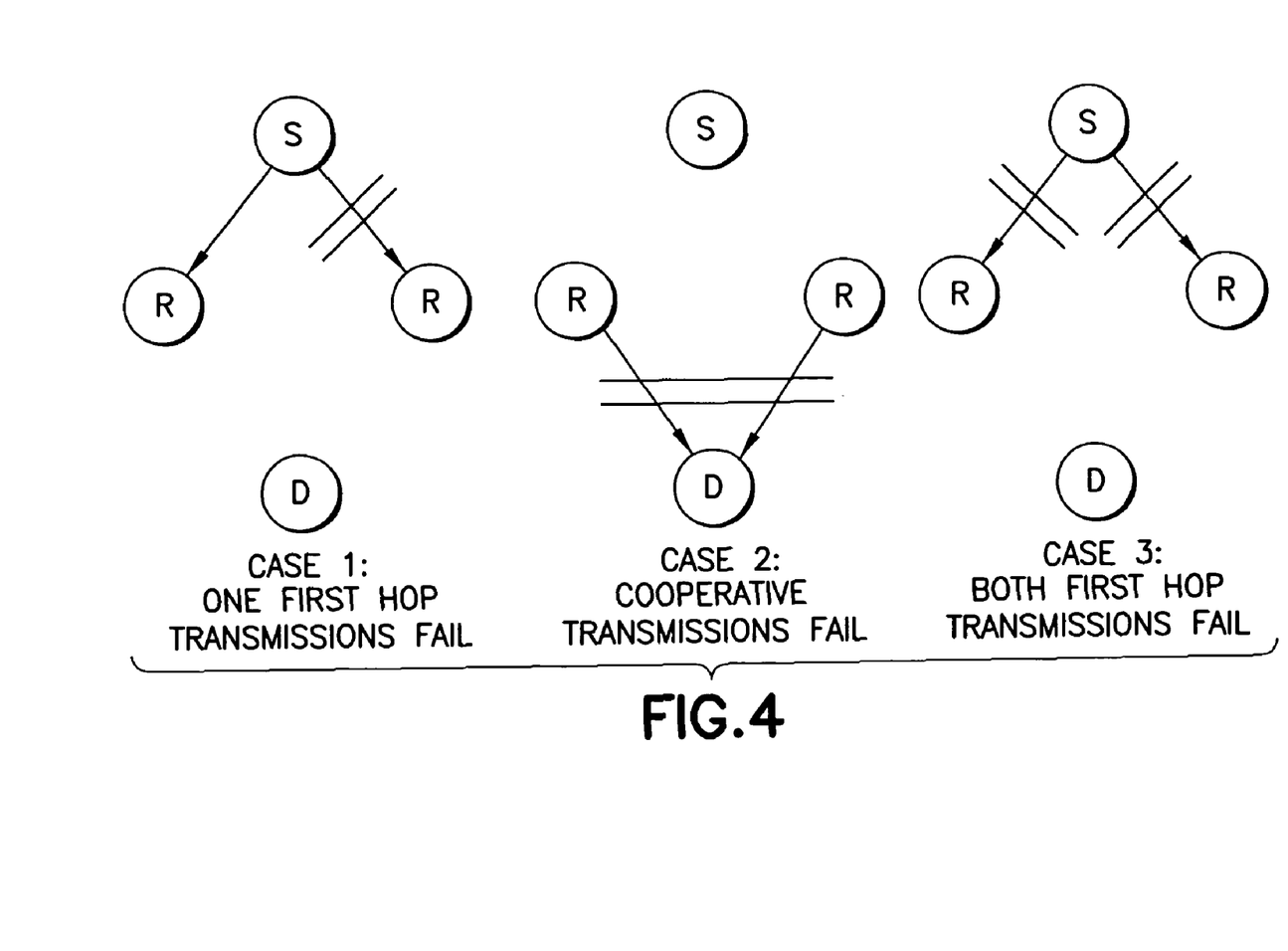
FIG. 4 illustrates different cases of failed transmissions, specifically one first hop transmission fails (case 1), cooperative transmission fails (case 2) and both first hop transmissions fail (case 3).

Most of the cooperative relaying schemes proposed in the literature can deal with the case 1 shown in FIG. 4, when one of the relays cannot decode the received packet. In the case of distributed space time block codes only the relay that successfully decoded the data will transmit and the destination is still able to decode the data.

However, the published literature does not consider open loop MIMO schemes such as V-BLAST or space-time codes, and possible optimizations in relay systems for retransmissions when the second hop transmission fails.

Typically for MBMS it is assumed that a multimedia data stream is sent to the users in a cell in a manner similar to a broadcast service such as television. However, in many cases (e.g., firmware update of a user terminal, delivery of a new application, downloading of multi-media content for later use) it would be desirable to have the possibility for reliable data transmission, that is, where the user terminal can request a retransmission. MBMS without feedback is typically designed to cover at least 95% of the service area and robust modulation and coding is used, which requires a large amount of resources. However, for reliable data transmissions an infrequent channel quality feedback can be requested from the user terminals and, if all of the MBMS users have a sufficiently high SINR, then open loop MIMO schemes such as V-BLAST or space-time coding can be utilized to improve the resource utilization. In this case it is desirable to optimize the retransmissions.

Exemplary of different cooperative relaying schemes proposed in the literature, an overview of the cooperative relaying schemes studied in WINNER will be provided. In the WINNER project several cooperative relaying schemes that were investigated are as follows.

A first approach is a fixed relaying scheme, where two relays decode the signal of two users (both relays use SDMA to decode the signal of the two users) and forward it cooperatively to the base station using a distributed space time block code. This approach is best suited for use on the uplink.

A second approach is a relay cyclic delay diversity scheme that increases the frequency selectivity of the channel. With this method only one parameter, the cyclic shift in the time domain, can be controlled for each relay. Thus, it is not possible to optimize broadcast/multicast and unicast transmissions in different OFDMA sub-channels at the same time.

A third approach is an adaptive decode and forward scheme, and its enhancement YARP. In this case the relays only forward the signal if they can decode the input signal correctly. This technique is not designed to optimize a unicast or a broadcast/multicast transmission, but is intended instead to provide additional diversity.

Several publications relate at least in part to ARQ and cooperative relaying. However, in these publications it is assumed that the destination receives the signals of the source and the relay.

J. N. Laneman, D. N. C. Tse, and G. W. Wornell, "Cooperative Diversity in Wireless Networks: Efficient Protocols and Outage Behaviour", IEEE Transactions on Information Theory, April 2003, describe a technique where the relay only transmits when necessary.

E. Zimmermann, P. Herhold, and G. Fettweis, "A Novel Protocol for Cooperative Diversity in Wireless Networks", in The Fifth European Wireless Conference—Mobile and Wireless Systems beyond 3G, February 2004, describe a technique where the relay only transmits if it has decoded the data correctly.

J. N. Laneman, "Limiting Analysis of Outage Probabilities for Diversity Schemes in Fading Channels", in IEEE Global Communications Conference (GLOBECOM), San Francisco, December 2003, describe a technique where the relay does not simply use repetition coding, but instead uses a different and jointly designed codeword.

E. Zimmermann, P. Herhold, P., and G. Fettweis, "The impact of cooperation on diversity-exploiting protocols", 59th IEEE VTC 2004-Spring, 17-19 May 2004 Page(s): 410-414 Vol. 1A, describe a technique that is a combination of the preceding three approaches.

I. Stanojev, O. Simeone and Y. Bar-Ness, "Performance Analysis of Collaborative Hybrid-ARQ Protocols over Fading Channels", in Proc. Sarnoff Symposium, NJ, USA, March 2006, describe the use of orthogonal space-time block coded H-ARQ.

None of the foregoing approaches, nor any others that the inventors are currently aware of, permit the simultaneous use of broadcast/multicast and optimized unicast transmission with cooperative relays.

SUMMARY OF THE EXEMPLARY EMBODIMENTS

The foregoing and other problems are overcome, and other advantages are realized, in accordance with the non-limiting and exemplary embodiments of this invention.

In a first non-limiting exemplary aspect thereof this invention provides a method that includes operating a plurality of relay nodes to cooperatively transmit unicast data from a source to a destination receiver and, while cooperatively transmitting the unicast data, at least one of the plurality of relay nodes responding to feedback signaling from the destination receiver for causing transmissions from each of the plurality of relay nodes to add coherently at the destination receiver.

In another non-limiting exemplary aspect thereof this invention provides a method that includes operating a plurality of relay nodes to cooperatively transmit unicast data from a source to a destination receiver and, while cooperatively transmitting the unicast data, responding to a request for retransmission from the destination receiver by at least one of the plurality of relay nodes changing transmission symbols such that a cooperative retransmission results in the destination receiver effectively receiving a distributed space-time block code.

In another non-limiting exemplary aspect thereof this invention provides a method that includes operating a plurality of relay nodes to cooperatively transmit at least one of broadcast and multicast data from a source to a plurality of destination receivers and, while cooperatively transmitting the at least one of broadcast and multicast data, each of the plurality of relay nodes using time varying phase offsets to induce temporal variations in an effective channel seen at each of the plurality of destination receivers.

In a further non-limiting exemplary aspect thereof this invention provides a method that includes operating a plurality of relay nodes to cooperatively transmit at least one of broadcast and multicast data from a source to a plurality of destination receivers and, while cooperatively transmitting the at least one of broadcast and multicast data, each of the plurality of relay nodes using time varying phase offsets to induce temporal variations in an effective channel seen at each of the plurality of destination receivers.

In another non-limiting exemplary aspect thereof this invention provides a method that includes operating a plurality of relay nodes to cooperatively transmit at least one of broadcast and multicast data from a source to a plurality of destination receivers and, while cooperatively transmitting the at least one of broadcast and multicast data, responding to a request for retransmission from one of the destination receivers by at least one of the plurality of relay nodes changing transmission symbols such that a cooperative retransmission results in the destination receiver effectively receiving a distributed space-time block code.

In another non-limiting exemplary aspect thereof this invention provides an apparatus that comprises a wireless receiver, a wireless transmitter and a transmission control unit configurable to cooperatively transmit at least one of broadcast and multicast data through first subchannels to a plurality of destination nodes, and to simultaneously cooperatively transmit unicast data through second subchannels to at least one destination node, where the first subchannels and the second subchannels are controlled differently.

BRIEF DESCRIPTION OF THE DRAWINGS

The foregoing and other aspects of the teachings of this invention are made more evident in the following Detailed Description, when read in conjunction with the attached Drawing Figures, wherein.

DETAILED DESCRIPTION

In an exemplary aspect thereof the embodiments of this invention pertain to mobile communications systems and, more specifically, to methods and apparatus to enable a relay to operate simultaneously in a broadcast mode and in a unicast mode.

An aspect of this invention deals with the case 2 shown in FIG. 4 (i.e., cooperative transmission fails) for open loop MIMO schemes in the first transmission.

A further aspect of this invention pertains to retransmissions for broadcast services that use open loop MIMO schemes, such as V-BLAST.

In the last publication referred to above (I. Stanojev et al., "Performance Analysis of Collaborative Hybrid-ARQ Protocols over Fading Channels", in Proc. Sarnoff Symposium, NJ, USA, March 2006) the focus is on analysis, which implicitly assumes orthogonal space-time block codes. The exemplary embodiments of this invention deal with a more general case, and provide solutions for the case where the combined signal is explicitly not a space-time block code, but a limited diversity code (such as STTD-OTD, e.g., see Chapter 8 in Hottinen, Tirkkonen, Wichman, Multi-antenna transceiver techniques for 3G and beyond, John Wiley and Sons, 2003), or an antenna punctured version thereof. Further, the Stanojev publication assumes the presence of only one relay, whereas the exemplary embodiments of this invention can encompass the presence of at least two relay units.

In an OFDMA system typically the transmission resources are split into sub-channels or "chunks" containing a group of sub-carriers and several consecutive OFDM symbols. Further, the size of the sub-channels is usually chosen such that it is within the coherence bandwidth and the coherence time. In a flexible OFDMA system some of these sub-channels are dedicated to broadcast/multicast services and some are dedicated to unicast services. The number of sub-channels dedicated to each service can vary over time and is preferably flexible.

Figure 5:
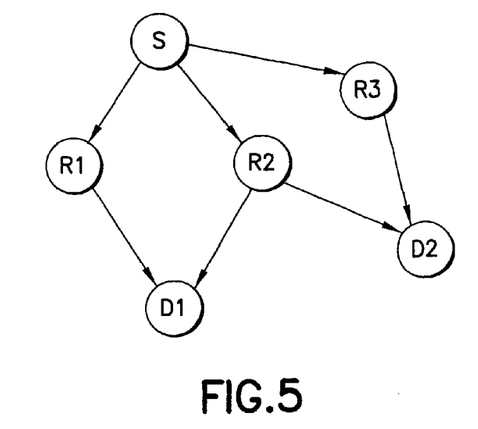
FIG. 5 shows an example of transmissions in a relay enhanced cell.
Figures 8A, 8B, 8C:
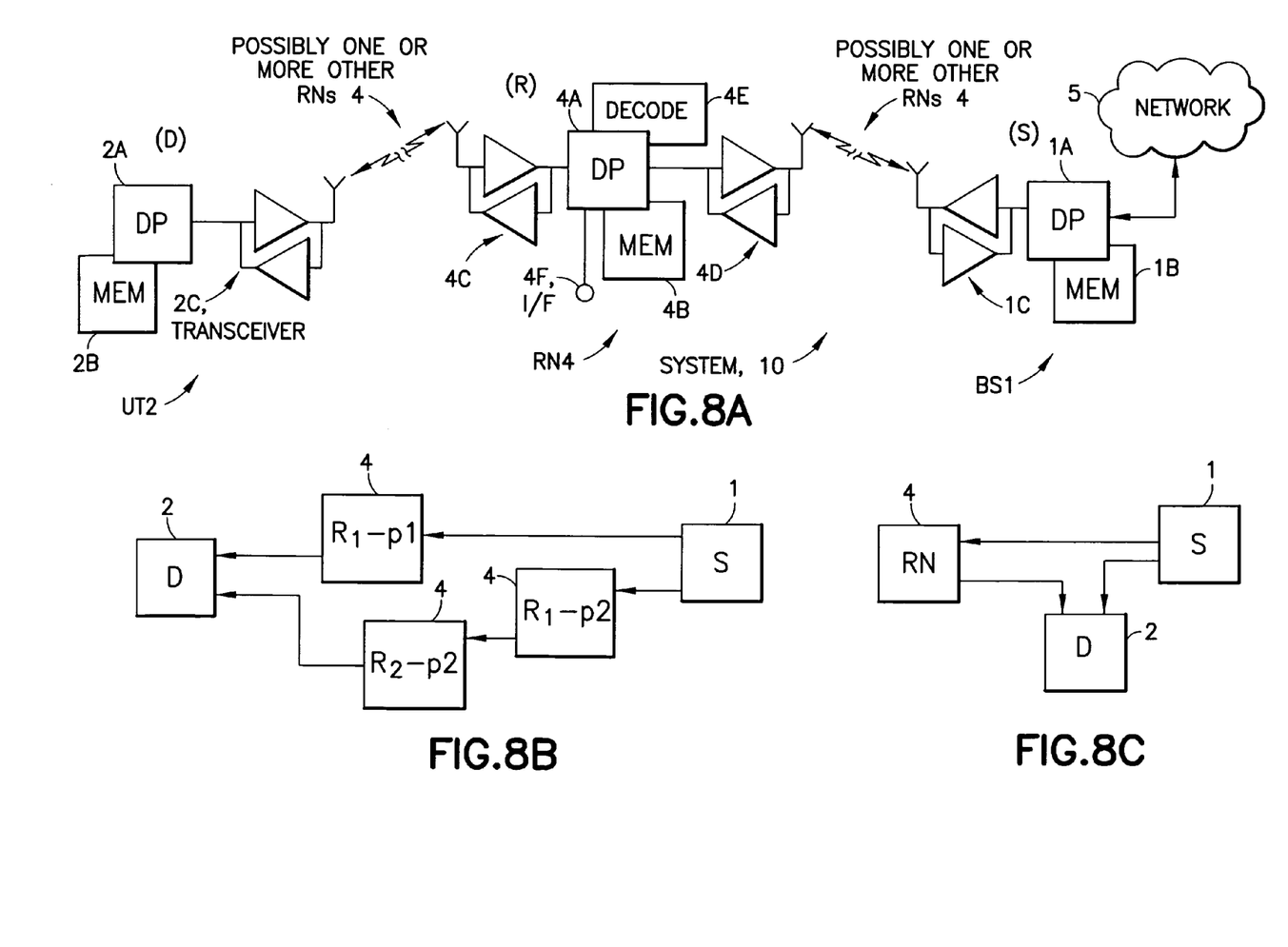
FIG. 8A is a simplified block diagram of a wireless communication system that includes at least one relay node constructed and operated in accordance with the exemplary embodiments of this invention to implement a cooperative relay system.
FIG. 8B is a simplified block diagram of a wireless communication system that includes a plurality of relay nodes constructed and operated in accordance with the exemplary embodiments of this invention to implement a cooperative relay system.
FIG. 8C is a simplified block diagram of a wireless communication system that includes a plurality of relay nodes constructed and operated in accordance with the exemplary embodiments of this invention to implement a cooperative relay system.

FIG. 5 shows a relay enhanced cell with 3 relays, where R1 and R2 are cooperatively transmitting to D1, and R2 and R3 to D2. R2 is involved in two transmissions and therefore different resources have to be allocated for each of the cooperative transmissions. Note that there is no restriction placed on the number of relays involved in the cooperative transmissions. However, for reasons of clarity the exemplary embodiments of this invention are described in the context of two relays (R) engaged in a cooperative transmission, and it is straightforward to extend the methods described herein to the case of three or more relays engaged in a cooperative transmission. For example, reference can be made to FIG. 8B which shows an embodiment of a cooperative relay system having a plurality of wireless nodes, including a source (e.g., BS 1), a destination (e.g., UT 2), and a multi-hop relay (R) arrangement where there is one relay node 4 in a first path ($R_1\_p1$) between the S and the D, and where there are two relay nodes 4 in a second path ($R_1\_p2$, $R_2\_p2$) between the S and the D. Note that in this case the relay node $R_2\_p2$ may be considered as the destination (D) for the relay node $R_1\_p2$. Reference may also be had to FIG. 8C which shows another embodiment of a cooperative relay system having a plurality of wireless nodes, where there is a single relay node 4, and where the destination 2 receives a signal directly from the S (e.g., from the BS 1) and also from the RN 4. In general, a relay network or mesh network may have more than two hops, e.g., a chain containing S-RN-RN-RN-D, and the cooperation can occur between any of the wireless nodes in the chain, and may preferably occur at those nodes that are located at adjacent hops.

Figure 6:
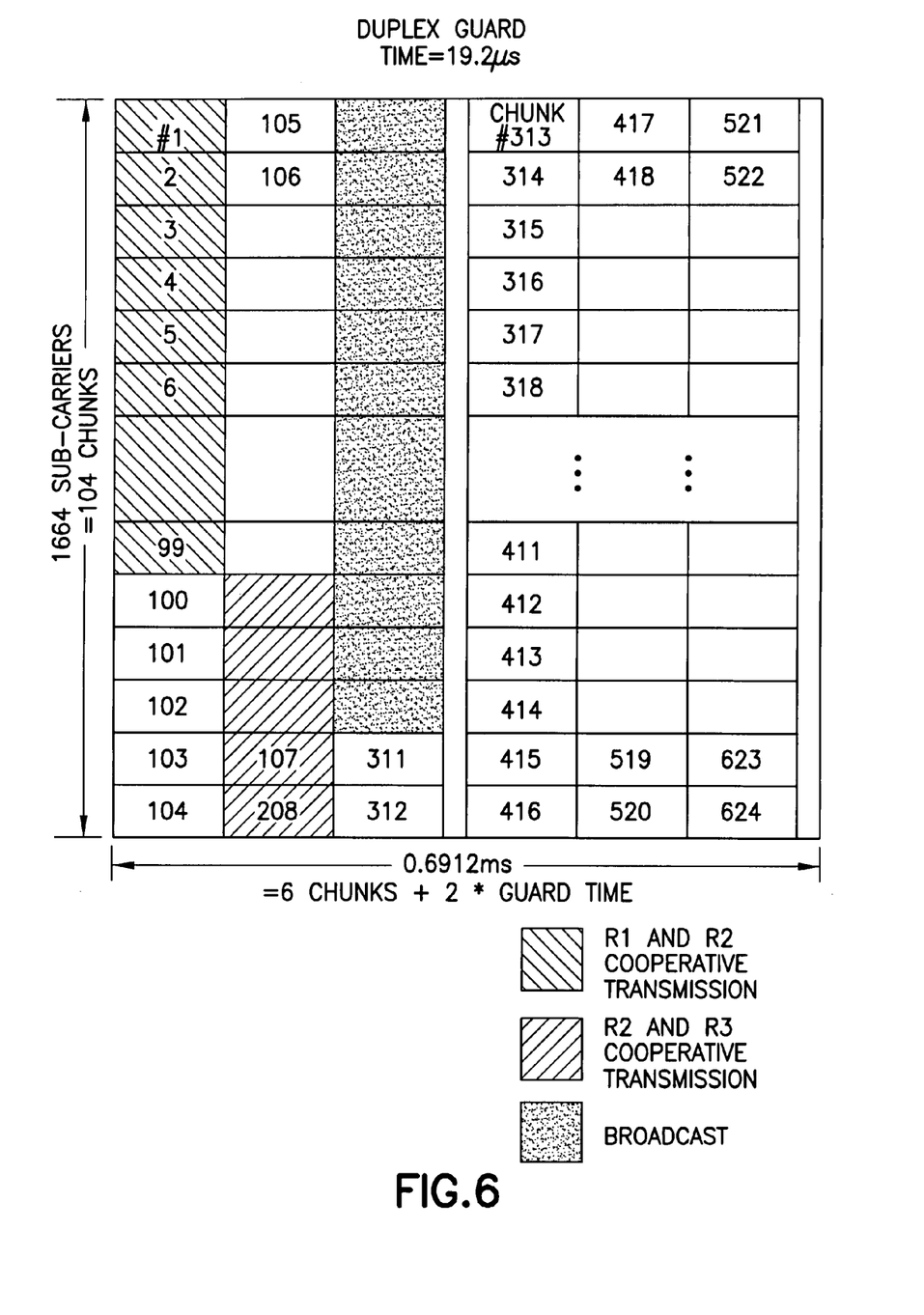
FIG. 6 shows an exemplary resource allocation for several cooperative unicast and broadcast transmissions.

FIG. 6 illustrates one possible resource allocation. Note that it also includes sub-channels that are allocated to a broadcasting service, i.e., where all 3 relays transmit at the same time.

In the case of cooperative unicast transmissions the relays (R) know to which destination they are transmitting and, in an ideal case, their signals add coherently at the destination (D) for each sub-channel. This can be achieved by known multi-antenna techniques. In the following two scenarios are described where it is assumed that the transmissions of the relays (R) are synchronized.

Cooperative Unicast Transmission with Feedback

For this scenario the destination (D) signals a phase offset, e.g., 2 bits per sub-channel in use, to one of the relays (R) in order that the signal of the two relays combines coherently for every sub-channel. This method implies that the destination (D) is able to estimate the channel to both relays, for example, where each relay (R) sends its own pilot signals.

In another embodiment the relays (R) may have, for example, four different phase offsets for each sub-channel, and they use them alternately (also known as phase-hopping). The destination (D) estimates the channel and signals to the relays (R) which of the four phase offsets was best for each sub-channel. In following transmissions the relays (R) use those phase offsets that are determined to provide the best result at the destination (D).

Note that in both cases the feedback is only sent to the relay (R) and the base station or source (S) need not be involved.

Cooperative Unicast Transmission Using Retransmissions to form a Space-Time Block Code Alternatively, the system may use open loop MIMO schemes, such as V-BLAST or space-time codes, for high speed users by example, where the feedback is unreliable, or for users with low data rates where the feedback load would be too large as compared to the transmitted data.

In this case there are several possible ways in which to organize retransmissions. One approach is for the destination (D) to send a NACK to the relays (Rs) which then forward the NACK to the source (S), and the source then schedules the cooperative retransmission. However, this approach requires a significant amount of signaling, and is not preferred. Instead, an approach that does not require the source (S) to be involved in the retransmission is preferable.

In a second aspect, note that if the relays (Rs) do more than simply repeat the cooperative transmission, then the probability that the destination (D) can decode the signal can be increased. With limited signaling capabilities between relay nodes, one relay node may not know whether a neighboring relay node is retransmitting the same signal at the same time. Thus, the retransmission policy is preferably one that enables gain to be achieved (at least on average) despite imperfect synchronization, or imperfect channel state information. To enhance this embodiment there is a need to increase the probability of successful reception at the destination node, with two or more interfering relay nodes.

Additionally, the preferred embodiment should be able to cope with the situation illustrated in FIG. 5, where one of the relay nodes (R2 is this example) is involved in another cooperative transmission and is not able to participate in the cooperative retransmission.

Three non-limiting example embodiments are now described.

Example 1

Two Single Antenna Relays where the Entire Data is Available at Both Cooperating Relays To resolve the second aspect above, assume that at least one relay node changes its transmission symbols (keeping the FEC code intact), so that the combined transmission (first transmission and at least one repeated transmission) jointly form a signal that is amenable for improved detection or decoding. As an example, considering two relays (R1 and R2) R1 may transmit during slot 1

$$[x_1 x_3 \ldots x_{2N-1}]^T, \quad (1)$$

where N specifies the number of symbols transmitted by a single relay during the slot. The second relay R2 may transmit during slot 1

$$[x_2 x_4 \ldots x_{2N}]^T, \quad (2)$$

and a two-antenna destination can then decouple the two streams in a MIMO-compatible channel. If not, an ARQ request is sent to R1 and R2, and they respond by sending simultaneously during slot 2, from R1

$$[-x_2^* -x_4^* \ldots -x_{2N}^*]^T, \quad (3)$$

and correspondingly from R2 during slot 2

$$[x_1^* x_3^* \ldots x_{2N-1}^*]^T, \quad (4)$$

The resulting signal received by the destination (D), when combined over the transmissions, is essentially described by a distributed Alamouti scheme. General reference with regard to the Alamouti scheme can be made to "A simple transmit diversity technique for wireless communications", Alamouti, S. M., Selected Areas in Communications, IEEE Journal on, Volume 16, Issue 8, October 1998, page(s): 1451-1458. The well-known Alamouti scheme, or any other full diversity scheme, implies that all symbols are available in both (or all) relay nodes. In general, what is implied here is that the signal transmitted by the two relays (or by a base station and a relay node) form essentially a space time block code similar to the one proposed by Alamouti for two transmit antennas. The Alamouti scheme is similar to the STTD scheme used in 3GPP.

Depending on the number of transmitted signals during slot 1, it can be beneficial to reverse the order of the symbols transmitted in slot 2, i.e. for R1

$$[-x_{2N}^* \ldots -x_4^* -x_2^*]^T, \quad (5)$$

and for R2

$$[x_{2N-1}^* \ldots x_3^* -x_{2N-1}^*]^T, \quad (5)$$

For the second retransmission R1 and R2 can, for example, repeat the first transmissions, for the third retransmission repeat the first retransmission, and so on. The signal structure (with nested symbol arrangement) is suggested for single-carrier systems in frequency-selective channels, although it should be noted that the use of a nested symbol structure is not required by exemplary embodiments of this invention. Furthermore, here and elsewhere, the time dimension can be replaced by some other essentially orthogonal resource (such as frequency (sub-carrier)) or by a combination thereof.

Example 2

Two Single Antenna Relays where the Entire Data is not Available at the Cooperating Relays The transmission sequences given above provide full diversity and a high rate in a static channel. However, if diversity can be compromised, or both or all relay nodes do not have access to the same symbols, one may still improve reception by defining retransmission so that interference between received symbols transmitted from different relays is reduced. In this case, the retransmission may be carried out from R1 as in the original transmission, but from R2 during slot 2 the symbol signs are changed $$[-x_2 -x_4 \ldots -x_{2N}]^T, \quad (7)$$

Unlike Example 1, in this second example it is not required that the data transmitted by R1 is available at R2.

The relay that changes the sign may also be randomly selected, or the (relay-specific) sign change pattern can be signaled to a relay. In one embodiment the sign change patterns are taken from Hadamard (or some other orthogonal) sequences, so that relay k utilizes, for example, a Hadamard matrix construction (or some other orthogonal, unitary matrix) by multiplying the n th retransmission symbol sequence with (k, n) th element of the matrix. Clearly, the symbol ordering in all equations can be changed (the example above is motivated by a single-carrier system).

Example 3

Two, Two Antenna Relays where the Entire Data is Available at the Cooperating Relays The relay nodes may have more than one antenna, or possibly a different number of antennas in each relay. As an example, if the relay nodes have two antennas, the first transmission may be from the first and the second relay may be taken from columns 1,2 and 3,4 of the following matrix, respectively.

In this approach $X_A$ and $X_B$ are STTD blocks (similar to the Alamouti matrix but the antenna and time dimension is interchanged, note that STTD is used in 3GPP) and specify how the first transmission occurs.

$$X[t_1]=[X_A X_B]. \quad (8)$$

If a retransmission is requested, it is carried out with matrix $$X[t_2]=[X_A -X_B]. \quad (9)$$

If $X_A$ and $X_B$ are both STTD blocks with QPSK symbol constellations, the throughput during the first transmission is 4 bps/Hz. If a retransmission is needed the throughput is reduced to 2 bps/Hz. If the retransmission occurs within the channel coherence time the effective DSTTD received signal is converted to the effective STTD-OTD signal. If needed yet another retransmission can be carried out during the next two time epochs, using permuted antenna indices, or by sign-changed matrices. In the latter, this leads to the modulation matrix $$X = \begin{bmatrix} X_A & X_B \\ X_A & -X_B \\ X_B & X_A \\ X_B & -X_A \end{bmatrix}, \quad (10)$$

Note that the original modulation matrix illustrates the case of permutted antenna indices, and not the case of the sign changed matrices.

The reduced interference (orthogonality) of this rate half transmission follows immediately when summing up the two equivalent channel correlation matrices with different permutation matrices. Therefore, it can be seen that this embodiment utilizes sub-matrices of a particular delay sub-optimal space-time block code, such that initially only a fraction of the code is transmitted, and the retransmissions complete the code, with the relays (Rs) taking the role of antennas. With imperfect synchronization one may randomize the columns. In this case, on occasion, the symbol matrices or sequence are not optimal, but nevertheless they are improved over what is obtained by always using the same symbol construction. Moreover, if each relay has only one antenna, the same code constructions can be used, but to transmit the signal the relays need to receive more symbols. For example, in Example 2, each of the K relays need to recover (and retransmit) only a fraction 1/K of all symbols. In the full diversity case, each of the K relays recover and retransmit K symbols.

Figure 7:
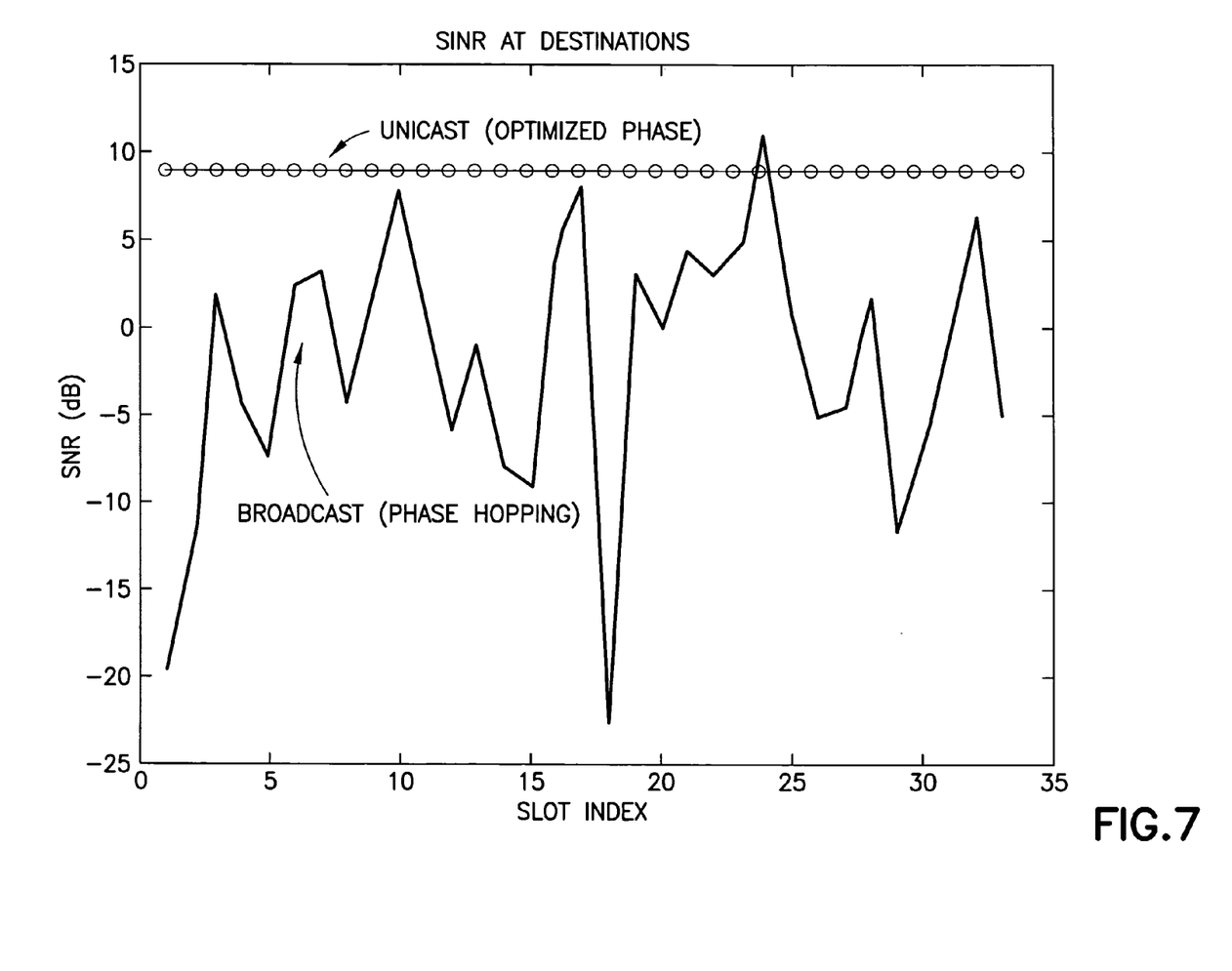
FIG. 7 is a graph plotting SINR versus slot index for an exemplary resource allocation for several cooperative unicast and broadcast (phase hopping) transmissions.

FIG. 7 shows an example of a resource allocation, where one unicast relayed subchannel signal uses optimal phases at each relay, and another signal, with randomized phases (i.e., with no channel state information used at relay nodes). Here, with 16 relay nodes, the unicast signal attains a high received SNR, whereas the broadcast signal exhibits temporal variability. The temporal variability can be used to increase diversity, simply by extending the encoded block (e.g., Turbo coded block, convolutionally coded block) over multiple slots. To optimize the system, the block length (in time) for the broadcast system may in part depend on the number of relay nodes and the randomization patterns that are used.

A discussion is now made of cooperative broadcast/multicast transmissions, including cooperative broadcast/multicast transmission without retransmissions and with retransmissions.

Cooperative Broadcast/Multicast Transmission Without Retransmissions

In the case of the broadcast transmissions (e.g., MBMS multimedia streaming) the signal transmitted by the relays cannot be optimized to a single destination. Moreover, the signals of the two relays R1 and R2 can cancel each other at the destination, i.e., deep fading dips can occur. Because of this certain broadcast service(s) might not be available to some static destinations (e.g., mobile terminals) in the relay enhanced cell. In order to introduce temporal variations to the effective channel seen by the destinations (D) this embodiment of the invention employs time-varying random phase offsets for each broadcast subchannel at the cooperatively transmitting relay nodes, whereas the unicast subchannels may use fixed phases, as an example. The phase offsets for broadcast are designed in such a way that they create sufficient variations at a static destination within the FEC code length used in the system. Secondly the variations are slow enough so that the destination (D) is still able to estimate and track the channel.

Cooperative Broadcast/Multicast Transmission with Retransmissions

In many cases (e.g., a firmware update of the user terminal, delivery of a new application, downloading of multi-media content for later use) it would be desirable to have the possibility for reliable broadcast/multicast data transmission, i.e., where the user terminal can request retransmissions. For reliable data transmissions an infrequent feedback can be requested from the user terminals and, if all MBMS users have a sufficiently high SINR, then open loop MIMO schemes such as V-BLAST can be utilized to improve the resource utilization. In this case it is desirable to optimize the retransmissions. Therefore, in this embodiment of the invention it may be desirable to use the same strategy described above with regard to cooperative unicast transmission, using retransmissions to form a STBC also for cooperative broadcast/multicast transmissions.

The cooperative relays R1, R2 send the data during the first slot based on an open loop MIMO scheme such as V-BLAST. If the relay nodes R1, R2 receive a NACK from one of the broadcast/multicast user terminals, then they send a retransmission, e.g., three slots later. The delay for the retransmission is preferably long enough to allow the cooperating relay nodes to signal to each other that a retransmission is necessary. If no retransmission is required, then new data is sent instead.

This embodiment preferably uses a control channel for the user terminal (the destination D in this case) to send ACK/NACKs to the cooperating relays R1, R2, and to send an indicator bit to the destination D that specifies if the broadcast data is a retransmission or if new data is broadcast.

Reference is now made to FIG. 8A for illustrating a simplified block diagram of various electronic devices that are suitable for use in practicing the exemplary embodiments of this invention that have been described above. In FIG. 8A a wireless communication system 10 implements a cooperative relaying network and includes at least one user terminal device (UT) 2 (the destination D in FIG. 5), at least one relay node (RN) 4 (the relay (R) in FIG. 5) and at least one access point or base station (BS) 1 (the source (S) in FIG. 5). The UT 2 and BS 1 each include a suitable controller, such as a data processor (DP) 2A, 1A, operatively coupled with a memory (MEM) 2B, 1B, respectively. The BS 1 can be coupled to a network 5, such as a local area network and/or a wide area network (such as the Internet) which can contain, for example, a source of content that is broadcast or multicast to a plurality of UTs 2. Each of the UT 2 and BS 1 includes at least one wireless (e.g., radio frequency) transceiver 2C, 1C, respectively, with at least one associated antenna. The at least one RN 4 is assumed to be similarly constructed, and may include a DP 4A and associated MEM 4B, and is adapted for communication with the UT 2 and the BS 1 with at least one or two, as shown, wireless transceivers 4C, 4D. Note that the RN 4 may be coupled directly to the UT 2, or indirectly coupled via one or more other RNs 4, and may be coupled directly to the BS 1, or indirectly coupled via one or more other RNs 4. The memories 2B, 1B and 4B are assumed to include program instructions, executable by the associated DPs 2A, 1A and 4A, respectively, for operation in accordance with the exemplary embodiments of this invention, as described above.

In general, the program instructions executable by the associated DP 4A operates the illustrated RN 4, and at least one other RN 4 (not shown), in the cooperative relaying network that facilitates the different operating modes for unicast and broadcast/multicast subchannels, as described above. The program instructions executable by the associated DP 1A operates the illustrated BS 1 to control the operation of the RNs 4 so as to implement the foregoing exemplary aspects of this invention. For any embodiment where feedback is used from the UT 2, then the program instructions executable by the associated DP 2A are also assumed to operate the illustrated UT 2 accordingly. The RN 4 may be assumed to include a suitable decoder function 4E if operated in the decode and forward embodiments described above. Each RN 4 may also include, if needed, an interface (I/F) 4F for conducting signaling with one or more other RNs 4 (see, for example, the description of the cooperative broadcast/multicast transmission with retransmission embodiment described above). For those embodiments that employ some type of signaling feedback from the UT(s) 2 then the receiver portion of the transceiver 4C may be used to receive the feedback signaling.

In general, the exemplary embodiments of this invention may be implemented at least in part by computer software executable by the DPs 2A, 1A, 4A, or by hardware, or by a combination of software and hardware.

In general, the various embodiments of the UT 2 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable devices, units and terminals that incorporate combinations of such functions.

The MEMs 2B, 1B and 4B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 2A, 1A and 4A may be of any type suitable to the local technical environment, and may include one or more of general purpose computers, special purpose computers, microprocessors, digital signal processors (DSPs) and processors based on a multi-core processor architecture, as non-limiting examples.

Based on the foregoing exemplary embodiments it can be appreciated that a RN 4 has a plurality of different operating modes for unicast and broadcast/multicast subchannels. For unicast services the phase offsets of those RNs 4 engaged in a cooperative transmission are optimized for the subchannels used for unicast services. Alternatively, when no feedback is available and an open loop MIMO or MIMO-type scheme, such as V-BLAST, is used, the cooperative retransmissions are performed in such a way so that the UT 2 receives effectively a distributed space-time block code. For the broadcast/multicast services it may be most desirable that time varying random phase offsets be employed for the subchannels used for broadcast services. For reliable high data rate broadcast transmissions it may be most preferred to use the above described cooperative retransmission scheme, that effectively forms distributed space-time block codes.

Note that the foregoing description has been primarily directed to the challenging case of two cooperating RNs 4. However, these embodiments can be applied as well to the case of base station 1 (S) and relay node 4 (R) cooperation as well.

Note further that the foregoing embodiments are not restricted for use with any one particular type of wireless communication system 10. Examples of systems that can benefit from the use of these embodiments include, but are not limited to, DAS networks, WiMAX 802.16j, WINNER and 3GPP LTE, if cooperative relay nodes are included in their respective standardization documents.

Note also that the foregoing embodiments can also be used with only one RN 4, where the source itself (e.g., the BS 1) is also received simultaneously by the destination.

It should be appreciated that there are a plurality of ways to implement the embodiments related to cooperative retransmissions. As such, the linear symbol transmission matrices and sequences described above should not be viewed as limiting the scope of these exemplary embodiments of the invention. The effective code, combined over initial transmission and repeated transmission, improves the orthogonality (or diversity), and this may be achieved by many linear transmission (modulation) methods.

The RNs 4 may be of arbitrary type, although the description above has assumed implicitly decode and forward-type relaying. However, the symbols may be also analog signals, or signals with arbitrary alphabet, possibly quantized, or subjected to non-linear operations (e.g., compression, quantization) before retransmission. Furthermore, the relay may have multiple antennas and may implement beamforming. In this case, the role of streams and beams are synonymous.

The use of the exemplary embodiments of this invention enables the wireless communication system 10 to optimize broadcast, multicast and unicast transmissions independently at the cooperative RNs 4. In this manner all of these different services can be transmitted simultaneously through the cooperative RNs 4 in a single OFDMA transmission. In addition, it is noted that the procedure to optimize the unicast transmissions does not require involvement by the source (e.g., base station 1), thereby reducing the signaling load.

Non-limiting advantages that are realized by the use of these exemplary embodiments of cooperative retransmission procedures include, but are not limited to, an increased probability that a retransmission from multiple RNs 4 is correctly detected, only low complexity RNs 4 are needed (in one simple embodiment, the signal retransmitted by a RN 4 is multiplied by −1), with a MIMO-capable destination, the channel throughput is increased, and the throughput for reliable broadcasting can be increased by optimizing the retransmissions.

Figure 9:
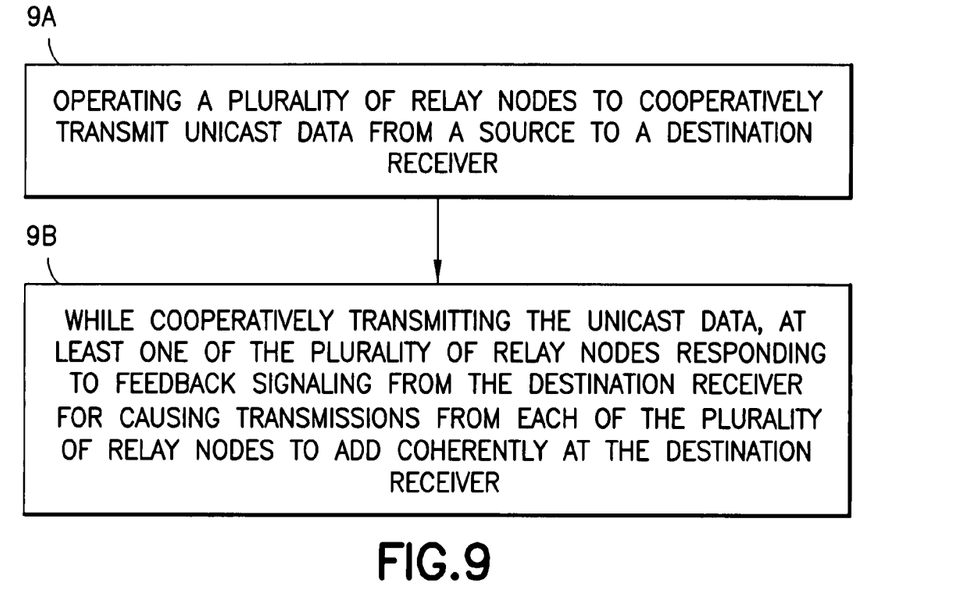
FIGS. 9-12 are each a logic flow diagram descriptive of a method, as well as the operation of computer program instructions, in accordance with non-limiting and exemplary embodiments of this invention.

Based on the foregoing description it can be appreciated that an aspect of this invention is a method, shown in FIG. 9, that includes operating a plurality of relay nodes to cooperatively transmit unicast data from a source to a destination receiver (Block 9A) and, while cooperatively transmitting the unicast data, at least one of the plurality of relay nodes responding to feedback signaling from the destination receiver for causing transmissions from each of the plurality of relay nodes to add coherently at the destination receiver (Block 9B).

Figure 10:
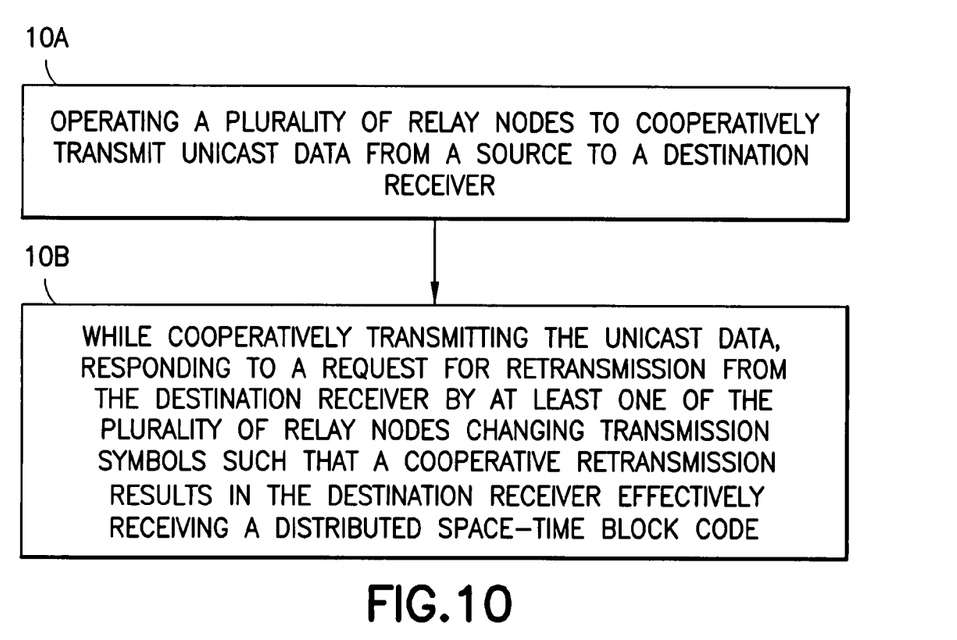

Based on the foregoing description it can be appreciated that another aspect of this invention is a method, shown in FIG. 10, that includes operating a plurality of relay nodes to cooperatively transmit unicast data from a source to a destination receiver (Block 10A) and, while cooperatively transmitting the unicast data, responding to a request for retransmission from the destination receiver by at least one of the plurality of relay nodes changing transmission symbols such that a cooperative retransmission results in the destination receiver effectively receiving a distributed space-time block code (Block 10B).

Figure 11:
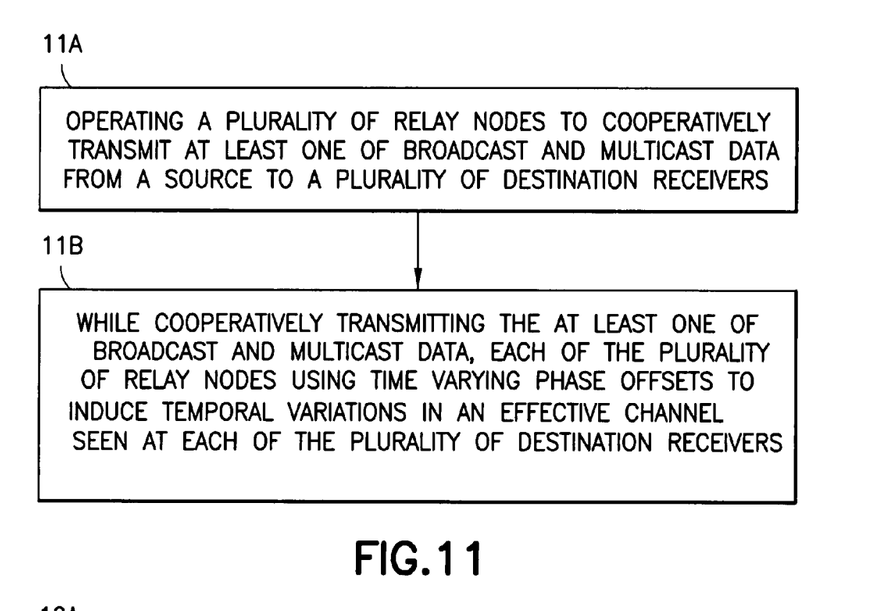

Based on the foregoing description it can be appreciated that a further aspect of this invention is a method, shown in FIG. 11, that includes operating a plurality of relay nodes to cooperatively transmit at least one of broadcast and multicast data from a source to a plurality of destination receivers (Block 11A) and, while cooperatively transmitting the at least one of broadcast and multicast data, each of the plurality of relay nodes using time varying phase offsets to induce temporal variations in an effective channel seen at each of the plurality of destination receivers (Block 11B).

Figure 12:
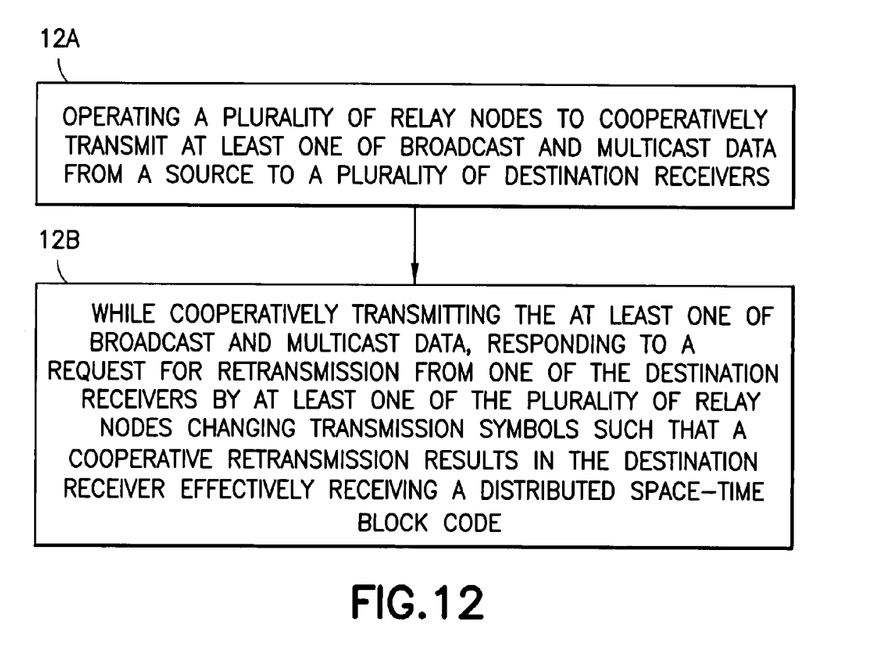

Based on the foregoing description it can be appreciated that another aspect of this invention is a method, shown in FIG. 12, that includes operating a plurality of relay nodes to cooperatively transmit at least one of broadcast and multicast data from a source to a plurality of destination receivers (Block 12A) and, while cooperatively transmitting the at least one of broadcast and multicast data, responding to a request for retransmission from one of the destination receivers by at least one of the plurality of relay nodes changing transmission symbols such that a cooperative retransmission results in the destination receiver effectively receiving a distributed space-time block code (Block 12B).

The various blocks shown in FIGS. 9-12 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

It should thus be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Various modifications and adaptations may become apparent to those skilled in the relevant arts in view of the foregoing description, when read in conjunction with the accompanying drawings and the appended claims. However, all such modifications of the teachings of this invention will still fall within the scope of this invention.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
receiving feedback signaling from a destination, where the feedback signaling comprises data describing subchannels between each of a plurality of wireless nodes to the destination;
transmitting, using a first unicast transmission on a first subchannel, a first portion of data from a first wireless node of the plurality of wireless nodes to the destination; and
transmitting simultaneously with the first unicast transmission, using a second unicast transmission on a second subchannel, a second portion of the data from a second wireless node of the plurality of wireless nodes to the destination,
where at least one of the first wireless node and the second wireless node are operated in accordance to the feedback signaling from the destination such that at least the first unicast transmission and the second unicast transmission add constructively at the destination.

2. The method of claim 1, where each of the plurality of wireless nodes is configured to transmit the data using one of n different phase offsets for each subchannel used to transmit the unicast data,
where n is greater than one,
where the feedback signaling indicates for each subchannel used which of the n different phase offsets provides the best reception for each of the used subchannels.

3. The method of claim 1, where the destination comprises one of a user terminal device or a relay node.

4. A method, comprising:
transmitting, using a first unicast transmission on a first subchannel, a first portion of data from a first wireless node of a plurality of wireless nodes to a destination and transmitting simultaneously with the first unicast transmission, using a second unicast transmission on a second subchannel, a second portion of the data from a second wireless node of the plurality of wireless nodes to the destination receiving a request for retransmission, where the request is received from the destination and received by at least one of the plurality of wireless nodes, in response to receiving the request, generating a third portion of the data such that the third portion comprises different transmission symbols than the first portion;

generating a fourth portion of the data such that the fourth portion comprises different transmission symbols than the second portion;

transmitting, using a third unicast transmission on the first subchannel, the third portion of the data from the first wireless node to the destination; and transmitting simultaneously with the third unicast transmission, using a fourth unicast transmission on the second subchannel, the fourth portion of the data from the second wireless node to the destination, where the third unicast transmission and the fourth unicast transmission results in the destination receiving a distributed space-time block code and the destination comprises one of a user terminal device or a relay node.

5. The method of claim 4, where all of the data being transmitted is available at the first wireless node and at the second wireless node, and where a combined transmission of the first portion and the third portion jointly form a signal that is amenable for improved decoding at the destination.

6. The method of claim 5, where the first portion of the data is defined as: $[x_1\ x_3\ \ldots\ x_{2N-1}]^T$, N specifies the number of symbols transmitted during a slot, the second portion of the data is defined as: $[x_2\ x_4 \ldots x_{2N}]^T$, the third portion of the data is defined as: $[-x_2^*\ -x_4^*\ \ldots\ -x_{2N}^*]^T$, the fourth portion of the data is defined as: $[x_1^*\ x_3^*\ \ldots\ x_{2N-1}^*]^T$, $x_i$ represents an i-th symbol, $-x$ represents a sign switch of the symbol x, $x^*$ represents a complex conjugate of x, and $[\ ]^T$ represents the transpose of a matrix $[\ ]$.

7. The method of claim 6, where symbols of the third portion and symbols of the fourth portion are transmitted in reverse order.

8. The method of claim 4, where not all of the data being transmitted is available at each of the wireless nodes involved in the cooperative retransmission, where sign symbols of the third portion are reversed compared to sign symbols of the first portion and sign symbols of the fourth portion are reversed compared to sign symbols of the second portion.

9. The method of claim 8, further comprising signaling a relay-specific sign change pattern to the second wireless node.

10. The method of claim 8, where a symbol sign change pattern is obtained from an orthogonal, unitary matrix by multiplying an nth retransmission with a (k,n)th element of said orthogonal, unitary matrix.

11. The method of claim 4, where each of the plurality of wireless nodes transmits to the destination using a plurality of transmit antennas, where all of the data being transmitted is available at each of the wireless nodes involved in the cooperative retransmission, where transmitting the first unicast transmission, $X_A$, from the first wireless node and transmitting simultaneously the second unicast transmission, $X_B$, from the second wireless node cooperatively transmits a matrix, $X[t_1]$:

$$X[t_1]=[X_A X_B],$$

where $X_A$ represents a first space time transmit diversity block and $X_B$ represents a second space time transmit diversity block.

12. The method of claim 11, where transmitting the third unicast transmission and transmitting simultaneously the fourth unicast transmission cooperatively transmits a matrix, $X[t_2]$:

$$X[t_2]=[X_A X_B], \text{ and}$$

$-X_B$ represents a sign-changed matrix of the second space time transmit diversity block.

13. The method of claim 12, responsive to another retransmission being requested, performing the another retransmission during two time epochs using permuted antenna indices with a modulation matrix, X:

$$X = \begin{bmatrix} X_A & X_B \\ X_A & -X_B \\ X_B & X_A \\ X_B & -X_A \end{bmatrix},$$

and $-X_A$ represents a sign-changed matrix of the first space time transmit diversity block.

14. A method, comprising:

operating a plurality of wireless nodes to cooperatively transmit at least one of broadcast and multicast data through first subchannels, and to simultaneously also cooperatively transmit unicast data through at least one second subchannel, from a source to a plurality of destinations; and while cooperatively transmitting the at least one of broadcast and multicast data and the unicast data, controlling transmission through the first subchannels differently than through the at least one second subchannel, where each of the plurality of wireless nodes uses time varying phase offsets to induce temporal variations in a channel seen at each of the plurality of destinations, where the phase offsets create a temporal variation within a forward error correction code length, while still enabling each destination to estimate and track the channel.

15. The method of claim 14, where at least one of the plurality of destinations comprises one of a user terminal device or a relay node.

16. A method, comprising:

operating a plurality of wireless nodes to cooperatively transmit at least one of broadcast and multicast data from a source to a plurality of destinations; and while cooperatively transmitting the at least one of broadcast and multicast data, responding to a request for retransmission from one of the destinations by at least one of the plurality of wireless nodes changing transmission symbols for the retransmission such that a cooperative retransmission results in the destination receiving a distributed space-time block code, where at least one of the plurality of destinations comprises one of a user terminal device or a relay node.

17. The method of claim 16, where responding to the request for retransmission occurs after a delay period sufficient to allow the plurality of cooperating wireless nodes to signal to one another.

18. The method of claim 16, further comprising:
sending acknowledgement/negative acknowledgement signaling over a control channel between a destination and the plurality of wireless nodes, and
sending an indication from the plurality of wireless nodes and the destination of whether the transmitted data is new data or a retransmission of data previously sent.

19. The method of claim 16, where cooperatively transmitting the at least one of broadcast and multicast data occurs through certain subchannels, and where other subchannels are simultaneously used for cooperatively transmitting unicast data that are controlled differently than the certain subchannels.

20. An apparatus, comprising a wireless receiver, a wireless transmitter, and a transmission control unit configured:
to cooperatively transmit at least one of broadcast and multicast data through first subchannels to a plurality of destination nodes, and
to simultaneously cooperatively transmit unicast data through second subchannels to at least one destination node,
where the first subchannels and the second subchannels are controlled differently,
where the apparatus uses a time varying phase offset to induce temporal variations in the first subchannel at each of the plurality of destination nodes, where the phase offset creates a temporal variation within a forward error correction code length, while still enabling each destination node to estimate and track the channel.

21. The apparatus as in claim 20, where said transmission control unit responds to feedback from the at least one destination node to change how the second subchannels are controlled to cause a received transmission at the at least one destination node to add constructively with a received transmission from another apparatus,
where the another apparatus is one of a relay node or a base station, and
where said transmit control unit responds to a request for a retransmission from a destination node to change transmission symbols such that a cooperative retransmission results in the destination node receiving a distributed space-time block code.

22. The apparatus of claim 21, where the unicast data is available at the apparatus and at the another apparatus, and
where the transmission symbols for a first retransmission are changed so that a combination of a first unicast transmission and the first retransmission jointly form a signal that is amenable for improved decoding at the destination node, and
where transmission symbols of the first retransmission from the apparatus are the same as transmission symbols of the original transmission from the apparatus, and transmission symbols of the retransmission from the another apparatus are the transmission symbol signs are changed.

23. The apparatus as in claim 20, where a transmission from another apparatus that is cooperatively transmitting the at least one of broadcast and multicast data with the apparatus induces the temporal variations.

\* \* \* \* \*